Oct. 19, 1965     T. R. MURRAY ETAL     3,212,226
METHOD AND APPARATUS FOR LOADING MEMBERS
Filed May 31, 1961     9 Sheets-Sheet 2

Oct. 19, 1965   T. R. MURRAY ETAL   3,212,226
METHOD AND APPARATUS FOR LOADING MEMBERS
Filed May 31, 1961   9 Sheets-Sheet 3

United States Patent Office 3,212,226
Patented Oct. 19, 1965

3,212,226
METHOD AND APPARATUS FOR LOADING MEMBERS
Thomas R. Murray, Munhall, and Walter W. Fahrion, Irwin, Pa., assignors to Westinghouse Electric Corporation, East Pittsburgh, Pa., a corporation of Pennsylvania
Filed May 31, 1961, Ser. No. 113,790
23 Claims. (Cl. 53—24)

The present invention relates generally to the loading of discrete nuclear fuel members in tubes, and more particularly to a multi-stage operation including automatic machinery for loading pellets in cladding tubes at an unusually high rate with a minimum of rejections.

Previous to the present invention the loading of fuel pellets in tubes was a costly and time-consuming hand operation that, on the average, produced a daily output of forty tubes with a shift personnel of four men. Along with this limited production, a twenty percent loss because of rejects was common. To reduce such inefficiencies the present invention comprehends the employment of a cladding tube loading machine, cartridge checking and loading accessories, and pellet dispensing equipment. By use of this invention production per man can be at least quadrupled and the number of rejects were reduced by a factor of twenty of that previously experienced. Such results can be obtained by the use of unskilled or semi-skilled personnel after only a short indoctrination course. In addition to the aforementioned manpower and material saving features, further savings have been realized by the use of this invention through the cartridge checking apparatus which allows for visual checking of pellets or chips and provides for alignment of pellets for later transfer to cladding tubes.

Accordingly, an object of the present invention is the provision of apparatus for more efficient and accurate loading of relatively short members in elongated tubes.

More specifically, it is an object of the invention to provide apparatus for the efficient loading of nuclear fuel pellets into cladding tubes therefor during the fabrication of fuel elements for a nuclear reactor.

Another object of the invention is to provide a multi-stage operation employing novel apparatus so as to increase the number of such tubes which can be loaded in a given unit of time.

Still another object of the present invention is to provide apparatus employed in a multi-stage operation whereby the previously mentioned anticipated waste due to rejects can be substantially decreased.

A further object of the present invention is to provide a means in a pellet loading system for visually checking the pellets for chips and perfectly sizing these pellets during a cartridge loading cycle so as to prevent any oversize pellets later being forced into cladding tubes.

A still further object of the present invention is to provide a machine for cladding tube loading which includes a vacuum assist and ram rod arrangement for insertion of the pellets into the particular cladding tube being loaded.

Yet a further object of the present invention is the inclusion in a cladding tube loading machine of a crimping arrangement for securing a disc in cladding tubes being loaded and for permitting vacuum pressure to pass around the disc, with the result that such crimping eliminates the process previously used for brazing discs in place during cladding tube loading assembly.

Another object of the present invention is the provision of a novel and efficient apparatus accessory to a cladding tube loading machine for crimping an end disc in a cladding tube.

Still another object of the present invention is to employ a collet-type arrangement at one end of a cladding tube loading machine so as to seat the one end of the cladding tube against a seal to permit a vacuum assist to pass therethrough while still permitting movement of the tube along the bed length of the machine for loading of pellets in the tube.

Yet another object of the present invention is the provision of a novel ratchet repeating automatic pellet transfer mechanism which can be used in place of manual transfer when desired for even faster feeding of pellets into cladding tubes.

These and other objects, features, and advantages of the invention will become more apparent upon consideration of the following detailed description of a cladding tube loading machine and its accessories incorporating various components constructed in accordance with the principles of the invention when taken in connection with the following drawings, in which:

The present invention comprehends a novel method and apparatus for loading cladding tubes and other elongated tubular members particularly with column or sectional quantities of fuel pellets or discrete members for neutronic reactors which has been primarily accomplished manually in the past. The present semi-automatic arrangement increases the effectiveness of loading such tubes by a substantial factor. Novel accessory apparatus is first used to place an end disc in each of the cladding tubes to be loaded and to place properly aligned and sized column lengths of pellets in transfer tubes. Sufficient quantities of elements, such as the cladding tubes and transfer tubes from such accessory apparatus, are then assembled at the main loading apparatus which actually accomplishes the loading of the pellets in a proper arrangement within the cladding tubes. This machine can be practically fully automatic with only one operator needed to place the assembled elements in the machine, operate the levers of electric and air controlled apparatus, and remove the elements afterwards. The initial feeding of the pellets from the transfer tubes into the cladding tubes can be primarily manual or automatic depending on the results desired at any particular time as explained hereafter. After the aforementioned initial feeding the main apparatus, by the actuation of the proper levers, automatically rams each column length of pellets in their final position and in certain applications secures a stop disc or member after it. A vacuum or suction assist is passed around the discs when secured in the cladding tube to aid in the proper positioning of the pellets prior to ramming thereof, so as to alleviate any adverse effects from such ramming. By the utilization of a carriage type loading system, as explained in more detail hereafter, a much more efficient loading of pellets in cladding tubes or other elongated tubes can be readily realized than that previously experienced.

Figure 1:
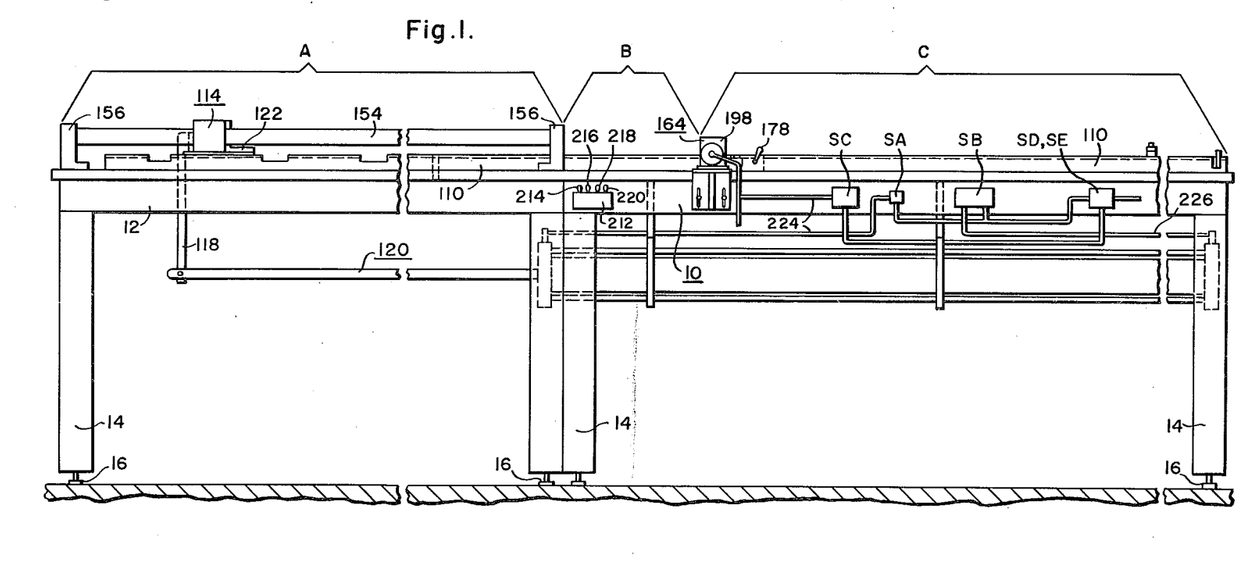
FIGURE 1 is a side elevational view of a cladding tube loading machine constructed according to the principles of the present invention.
Figure 2:
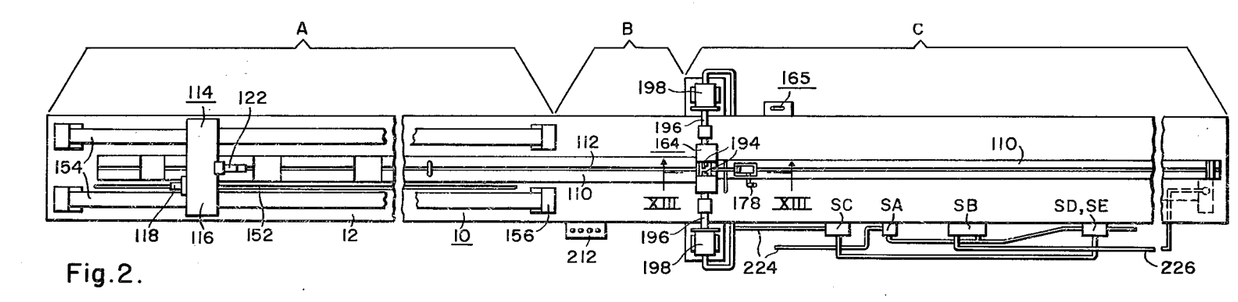
FIG. 2 is a top plan view of the machine shown in FIG. 1.

Referring more particularly to the drawings, the concepts of the present invention can best be understood by first taking a general view of a cladding tube loading machine 10 as illustrated in FIGS. 1 and 2. The cladding tube loading machine 10 comprises a bed portion or surface 12 which forms a table like arrangement with legs 14 and feet 16. The feet 16 are adjustable to enable the surface 12 to be placed in a level disposition. The main areas of function are designated by the bracketed portions of FIGS. 1 and 2, these portions being respectively the areas or stations A, B and C. Area A is that portion of the cladding tube loading machine 10 which serves the function of securing a cladding tube to the bed of the machine so that it can be moved readily in either longitudinal direction along the length of the machine. Area B is the place where the fuel pellets or discrete members and the transfer cartridges are placed on the bed of the machine so that the fuel pellets can be transferred from the cartridges into the cladding tubes. This transfer can be either manual or automatic as will be described in more detail later. Area C of the cladding tube loading machine 10 is for the ramming of pellets into the cladding tubes and crimping discs or stop members in place along each columnar length of the cladding tube after the pellets have been transferred thereto.

Figure 3:
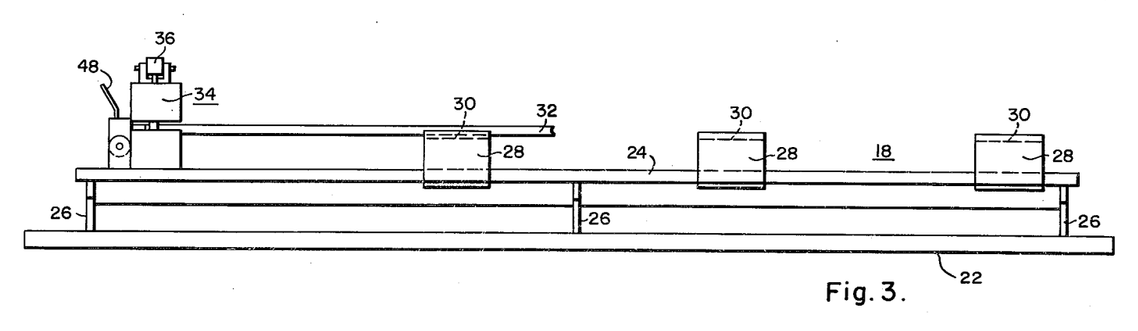
FIG. 3 is a partial side elevational view of an end crimping apparatus constructed according to the principles of the present invention.
Figure 4:
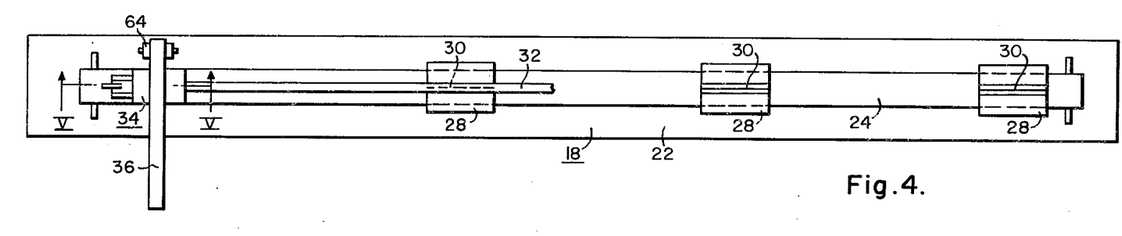
FIG. 4 is a top plan view of the crimping apparatus of FIG. 3.
Figures 7, 9:
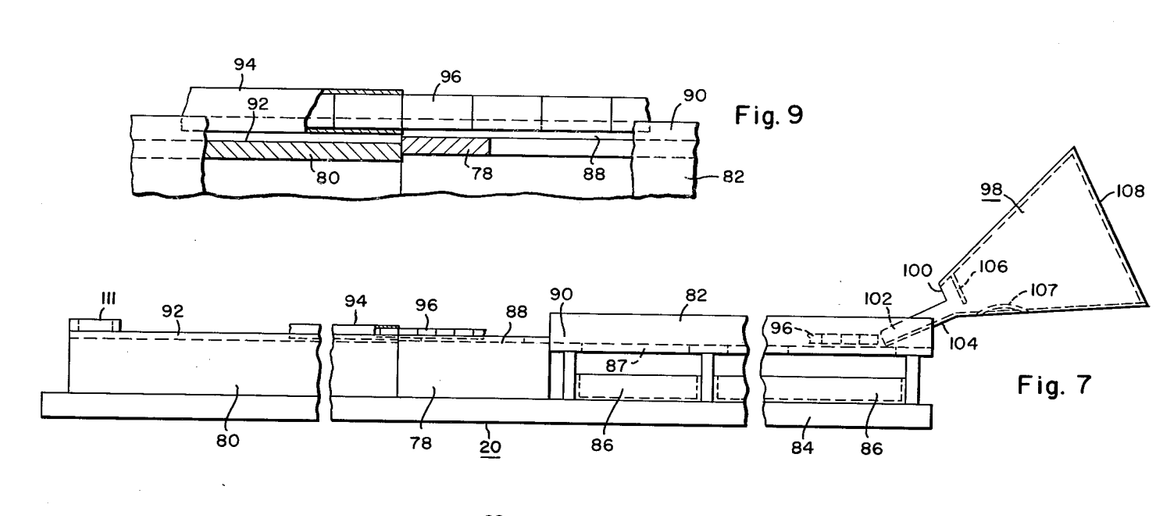
FIG. 7 is a side elevational view of a pellet dispensing and arranging apparatus constructed according to the principles of the present invention.
FIG. 9 is a partial enlarged view of FIG. 7 particularly illustrating the area at which the pellets are loaded into a transfer tube.
Figure 8:
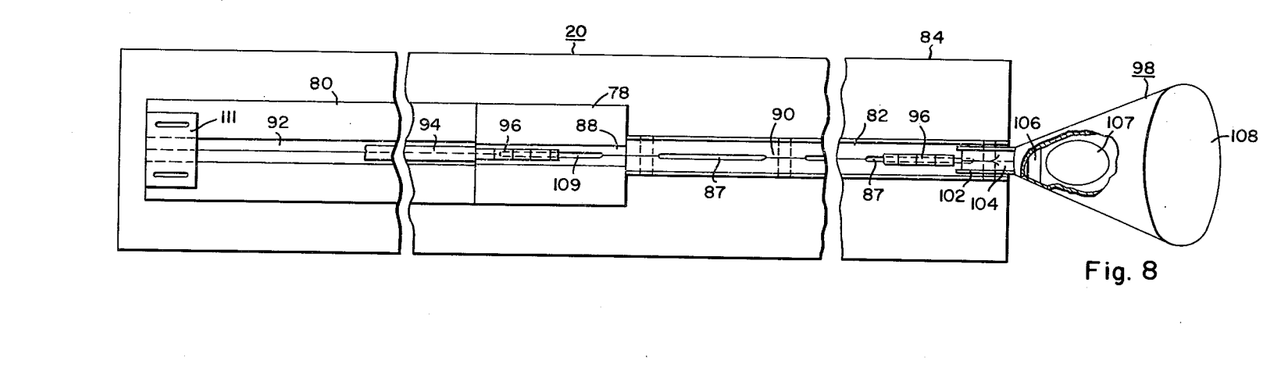
FIG. 8 is a top plan view of the apparatus of FIG. 7 with portions broken away.

In order for the cladding tube loading machine 10 to function properly a cladding tube 32, prior to being placed in the machine, must have one end substantially closed or otherwise stopped so that when pellets are inserted into one end of the cladding tube they will not just pass through the other end thereof. It can also be seen that it is first necessary to have the pellets lined up in the order and number necessary for each columnar section of the cladding tube to be loaded, and placed in transfer cartridges which are transferred in the area B prior to loading of the cladding tube. For this reason an end disc crimping apparatus 18 of FIGS. 3 and 4 is necessary to place a disc in the end of each cladding tube before it is placed in the cladding tube loading machine 10. A dispensing apparatus 20 as illustrated in FIGS. 7 and 8 is also necessary to properly align the necessary number of fuel pellets in a transfer cartridge before being brought to the area B of the cladding tube loading machine. Thus, before going into more details of the cladding tube loading machine 10, it would appear that an understanding of the prior stages of preparation as illustrated in FIGS. 3 to 9 is necessary.

As shown generally in FIGS. 3 and 4, the end disc crimping apparatus 18 is generally mounted on a table like surface 22 upon which a bed 24 is supported on legs 26. Guide blocks 28 are supported on the bed 24 and contain a V-shaped or channeled groove 30 for supporting the length of the typical cladding tube 32. Most desirably each groove is lined with some dirt resisting material, such as a polytetrafluoroethylene, having a low coefficient of friction so as to permit the cladding tube 32 to be easily slid along the series of aligned grooves 30 for insertion in an end crimper mechanism 34. After the cladding tube 32 is brought into position in the end crimper 34 a disc 44 (FIG. 6) is inserted into the end of the cladding tube and crimped into place so as to prevent fuel pellets 96 (FIG. 13) from exiting from the end of the cladding tube 32, when it is loaded in the cladding tube loading machine 10 (FIG. 1). This is primarily a hand operated crimping device with the lever 36 providing the force for closing dies 70 and 72 (FIG. 5) and crimping the end disc 44 in place.

Figure 5:
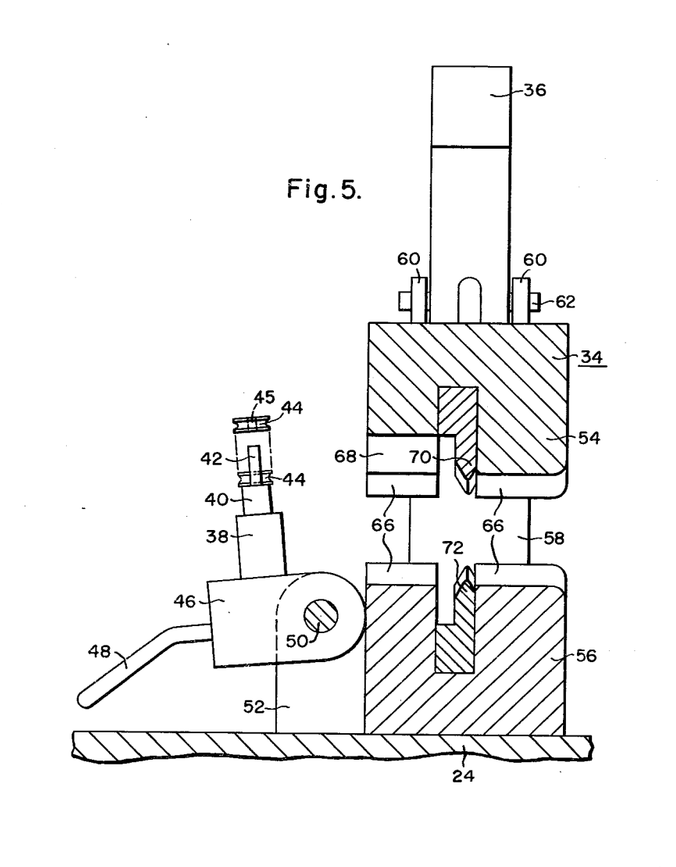
FIG. 5 is an enlarged fragmentary cross-sectional view of the crimping mechanism of the apparatus shown in FIG. 4 except that the handle is in a down position, and taken generally along the reference line V—V thereof.
Figure 6:
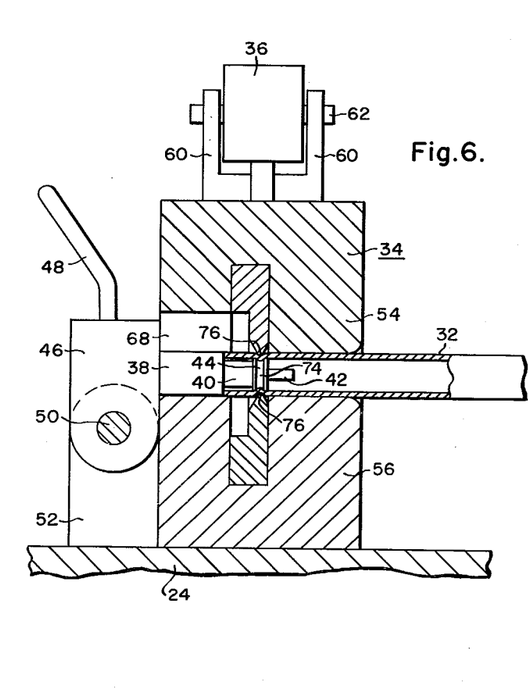
FIG. 6 is a view of the apparatus shown in FIG. 5 as the crimping operation takes place.

The operation of the end crimper 34 can best be seen from the enlarged sectional views illustrated in FIGS. 5 and 6. The end crimper 34 includes a male stud 38 which has a first narrowed or necked down portion 40 which is adapted to fit closely into the end of a cladding tube 32 a certain specified distance, generally that of an end plug which is later inserted into the end of the tube 32, and a second necked down portion 42 over which is fitted an end disc or stop 44, having a central aperture 45 of a slightly larger size than the portion 42. The manner of inserting the end disc 44 on the necked end portion 42 of the stud 38 is clearly shown in FIG. 5.

The stud 38 is mounted on a lever 46, which includes a handle 48 for pivoting the lever about a pivot pin 50. The lever 46 is mounted on a fixed base element 52 setting on the bed 24. Placed adjacent the lever 46 is a crimping member 34 which includes upper and lower crimping members 54 and 56, respectively. The lower member 56 is firmly secured to bed 24 while the upper crimping member 54 is vertically movable, through means of an upright support 58 and the arm 36, with respect to the lower block 56. The arm 36 is connected to the upper crimping member 54 through means of supporting projections 60 and pin 62 so that the arm 36 can be used to raise or lower the upper crimping member 54 as desired. The arm 36 is separately and pivotally connected to the bed 24 by any common method such as by a base 64 (see FIG. 4). Upper and lower crimping members 54 and 56 are adapted to mate with one another through interlocking tongue and groove portions 66. Additionally cut away from the upper crimping member 54 is an opening 68 which allows for the clearance of the stud portions 40 and 42 on the stud 38 so as to reduce the distance the crimping member 54 must be lifted when the stud is inserted within the jaws of the dies as illustrated in FIG. 6. Contained within the members 54 and 56 are the crimping dies 70 and 72, respectively, which, when the arm 36 is lowered after the end disc 44 is inserted in the end of the cladding tube 32, crimp in the wall of the cladding tube 32 so that it mates with a groove 74 in the disc 44. In this way projections 76 are formed which mate in the groove 74 to securely lock it in place in the cladding tube 32. As stated previously, stud 38 acts as a stop to adjust insertion of the stud portions 40 and 42 within the end of the tube so that there is allowed enough room between the disc 44 and that end for a plug to be later inserted.

The crimping lever 36 can also be spring loaded which would substantially reduce the amount of effort required to crimp in the end disc 44 after the stud 38 containing the disc 44 is rotated into position between the crimping dies 70 and 72.

After the crimping operation is accomplished, the cladding tube 32 is released from the bed 24 and is placed on a scale for weighing. After a predetermined number of tubes have had an end disc crimped in place, they are removed to the cladding tube loading machine 10 (FIG. 1) for use by the operator of that machine. The purpose for weighing the cladding tube 32 at this point is that the tube is again weighed after it is filled with pellets 96 (FIG. 13) to determine the exact weight of the pellets contained therein after loading.

In order to ensure that the pellets 96 enter the cladding tubes 32 easily it is necessary that sections of them are first properly aligned. One form of apparatus which is adapted to align the pellets 96 prior to their insertion in cladding tubes 32 is that illustrated in FIGS. 7 to 9. The pellet dispensing unit 20 generally has a bi-level bed comprising a higher level 78 and a lower level 80 which, together with a trough 82, are all located on a table-like surface 84. Beneath the trough 82 are located box-like units 86 for catching waste elements or pellets which drop through openings 87 in the bottom of the trough 82 as will be explained later. The upper bed portion 78 is located so that its one end is adjacent the trough 82 and is adapted to have its V-shaped groove 88 in horizontal alignment with a similarly shaped groove 90 of the trough 82. The lower bed portion 80 also has a V-shaped groove 92 which is somewhat lower than the groove 78 so as to accommodate one wall thickness of a transfer tube or cartridge 94, which has an identical diameter to that of the cladding tubes 32 (FIG. 3) in which pellets 96 are later to be loaded. With the beds 78 and 80 being at different levels the opening in the transfer cartridge 94 can be perfectly aligned with the pellets 96 so that they can be readily shoved into that opening. It is of course understood that instead of a multilevel, as described above, a single level bed (not shown) with grooves of varying depths could be used to accomplish the same purpose.

The purpose of this apparatus is to take the pellets 96 and place them into the transfer cartridge 94 which, as stated previously, are actually tubes of the same diameter as the cladding tubes 32 later to be loaded except that the length of each of these transfer cartridges is the length of a section, some predetermined portion, of the cladding tube, the section often being given the designation "column." When the pellets 96 are received by the person who operates the apparatus shown in FIGS. 7 to 9, they are either in a bag or in a special rolled sheet (not shown) having a series of rows of pellets with the pellets in each row placed in an end-to-end relationship. When in a bag they must first be taken by the operator and a few of them dumped in a dispenser 98 which has a funnel-like opening 100 at its one end and a lip 102 having a V-shaped channel 104 extending outwardly from the narrowed opening of the funnel to define a path of travel for pellets 96. Within the funnel 98 and near the mouth 100 thereof is a blocking extension 106 which extends towards a convex generally ellipsoidal protrusion 107 so as to permit the pellets 96 to pass from a wide end 108 of the funnel 98 in a generally aligned relationship around the protrusion and then into a perfectly aligned relationship down the V-shaped channel 104. In summary then, all the operator must do then to place the pellets 96 in an aligned relationship is to shake the pellets out of the small end of the dispenser 98 and they will automatically align themselves properly. This is thus one manner for aligning the pellets 96 which are to be placed in the V groove 90 of the trough 82. When the pellets, however, are received in the special rolled sheet described previously all that has to be done is to unroll a portion of the sheet and let the pellets drop into the trough 82 in an already aligned relationship, thus eliminating the necessity for a dispenser such as 98.

After the pellets 96 are aligned in the groove 90, which is preferably lined with a polytetrafluoroethylene material to reduce friction, and a transfer tube 94 is placed at the far end of the apparatus in the groove 92, all the operator needs to do is shove in a line of these pellets 96 past the anti-friction, lined groove 88 and into the open end of the transfer tube 94 until it is filled. Where the pellets 96 are of such a size that the last pellet sticks more than half way out, that last pellet is merely removed. After being loaded each transfer tube 94 is taken from the lower bed portion 80 and is placed in a tray (not shown) for later transfer to the cladding tube loading machine 10 (FIG. 1). If the pellets 96 are of such a length that the last pellet does not stick more than half way out, then it is merely left in place and the transfer tube 94 is then placed in the tray. The holes 87 in the trough 82 and a hole 109 in the upper bed portion 78 are provided so that any chips or scraps can drop through these holes and will not be transferred with the pellets 96 into the tube. An adjustable stop 111 is adapted to receive varying lengths of transfer cartridges.

Referring again to FIGS. 1 and 2, one form of cladding tube loading machine 10 constructed in accordance with the teachings of the present invention is illustrated therein. In this example, the machine is air operated and has a main bed portion 110 for supporting the length of a cladding tube 32 (FIG. 3). The bed 110 contains a generally V-shaped groove 112 which is preferably lined with an anti-frictional and non-dirt adhering tape, such as a polytetrafluoroethylene material, so as to permit ready movement of the cladding tube along the length of the bed 110.

A collet 114 is located adjacent one end of the bed 110 for clamping the cladding tube 32 in position for slidable engagement in the groove 112. The collet 114 is air operated so that it acts as a carriage which can run the cladding tube back and forth along the length of the bed 110 as the loading thereof progresses. For a more detailed showing of the collet arrangement reference is had to FIGS. 10 and 11. The collet 114 includes a main block or body portion 116 which is reciprocated along the bed 110 by means of arms 118, which are integrally attached to the back of the block 116 and are operated by an air operated drive mechanism 120 (FIG. 1). Secured to the block 116 is a T-shaped clamping member 122 which has its head portion 124 located in a mating groove 126 in the block 116 for correct alignment thereof. An elongated slot 128 extends through the head 124 adjacent each lateral edge thereof whereby a nut 130 can be tightened against a head bolt (not shown) extending from the block 116 through the elongated slot 128. The elongated slot 128 and bolt thus serve to provide for some vertical adjustment of the clamping member 122 when clamping the cladding tube 32 in position for resting in the V-shaped groove 112. This vertical adjustability permits the clamping member 122, and thus the collet 114, to accommodate variedly sized cladding tubes.

Figures 10, 11:
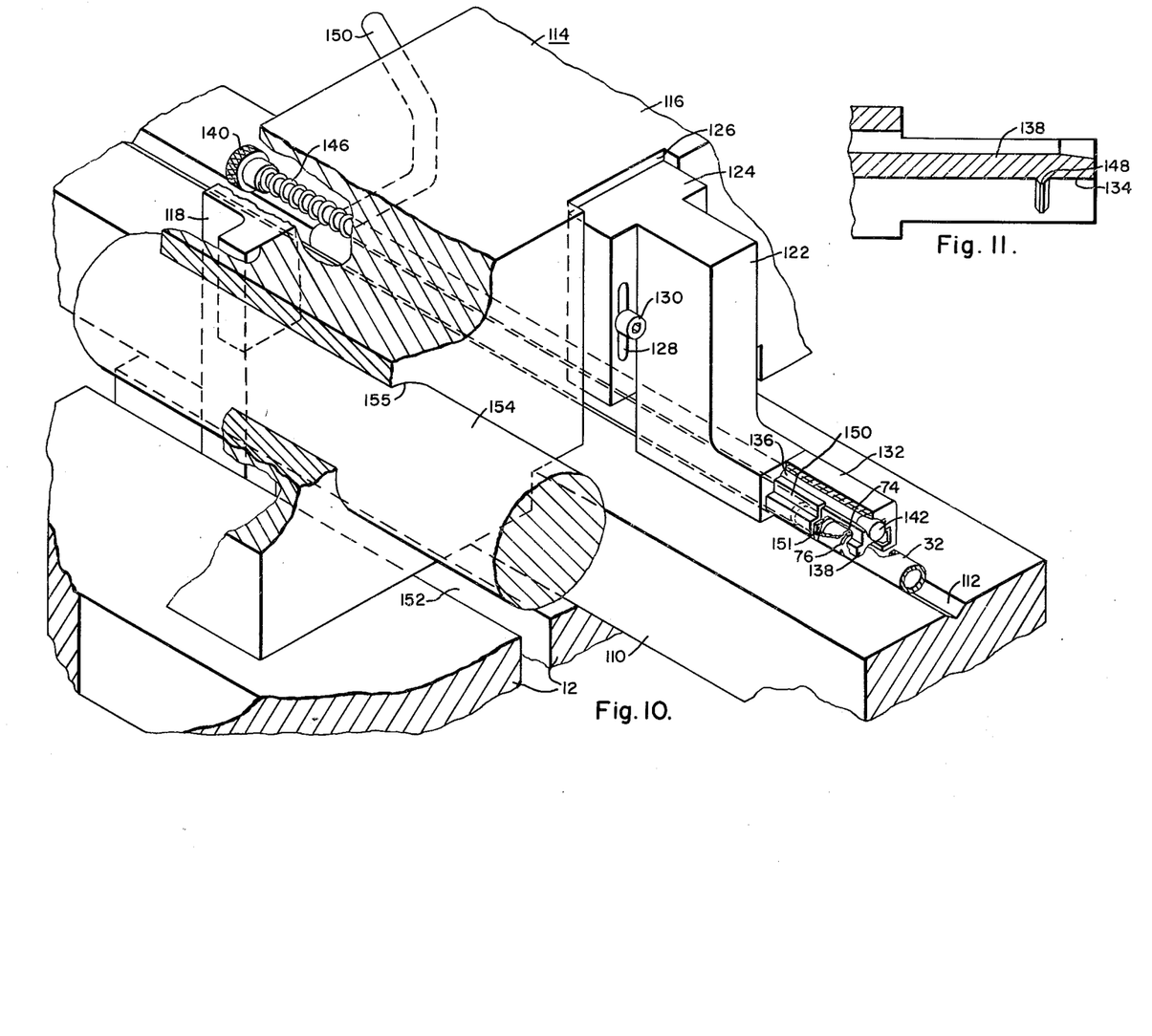
FIG. 10 is an enlarged view of the collet section of the cladding tube loading machine as illustrated in FIG. 1 with portions being broken away for clarity.
FIG. 11 is a partial cross-sectional view of the floating jaw portion of the collet as shown in FIG. 10 taken along the center of the floating jaw portion.

When a given tube such as the cladding tube 32 is in its final clamped position, the clamping member 122 does permit some freedom of movement of a plunger or rod 136 under an extension 132 and so that the cladding tube 32 can be slipped under it into the mating curved portion or groove 134 which has an arcuate surface formed to engage complementarily the curvature of the cladding tube 32. The final clamping action takes place upon release of the spring loaded rod 136 so as to cause a downward pressure upon a tube contacting element 138, commonly called a floating jaw, provided with the aforementioned curved portion 134.

As noted previously, the end of the cladding tube 32, which is inserted in the collet 114, is the end that has already had an end disc 44 inserted therein as explained previously with respect to FIGS. 5 and 6. Thus, when the spring loaded head 140 of the rod 136 is pushed inwardly a tapered capped end 142 of the rod is pushed outwardly from engagement with the tube contacting member 138 so as to permit release thereof for ready insertion or removal of the cladding tube 32. A spring 146 on the other end of the rod 136 causes the head 140 of the rod 136 to spring backwardly when it is released. This results in the cap end 142 exerting a downward pressure on the floating jaw 138 in order to clamp the cladding tube 32 in position for movement in the groove 112. The groove or indent 76 adjacent the end of the cladding tube 32 serves as a means for a projection 148 on the contacting element 138 to engage therewith for securely clamping the cladding tube 32 in position and for preventing its ready removal until the rod 136 is pushed in.

When a cladding tube 32 is brought into its final clamped position by means of the collet 114 its end containing the disc 44 is abutted against a tubular exhaust channel member 150 so as to be automatically sealed therewith. A gasket 151 or equivalent means can be used to seal the abutting ends of the tube 32 and channel 150, if desired. That is, at the released position of the plunger 136, free entry of a cladding tube 32 is allowed until the cladding tube is seated against the internal gasket or seal 151. In the plunger closed position the bevel or projection 148 engages the crimp 76 to pull the cladding tube 32 back against the gasket 151 making a vacuum tight jointure, which eliminates the need for adapters of any other kind to obtain vacuum assist in loading. The channel member 150 serves as a passage through which air can be evacuated from the cladding tube end through the aperture 45 (FIG. 5) in the end disc 44, so that atmospheric pressure aids in urging the pellets 96 (FIG. 7) into position once they enter the confines of the cladding tube 32 from the opposite free end. The pellets have a circumference less than the internal circumference of the cladding tube so as to be easily slid therewithin.

Referring again generally to FIGS. 1 and 2, the bed 110 of the loading machine 10 is generally of a length so that when the collet 114 is in its inwardmost position, the free open end of the cladding tube 32 does not extend into the area B thereof. It might be noted that the arm 118 described before as driving the collet back and forth does so by traveling in a slot 152 in the surface 12 of the loading machine 10 and that the collet 114 is actually carried on steel rods 154 extending through openings 155 (FIG. 10) in the block 116 of the collet 114, these rods being suspended from the surface 12 by way of brackets 156 fastened thereto in any conventional manner. Thus, in further explaining the location of the cladding tube 32 before the pellets are loaded, it can be said that the cladding tube at this time does not extend substantially beyond the central-most supporting bracket 156.

Figure 12:
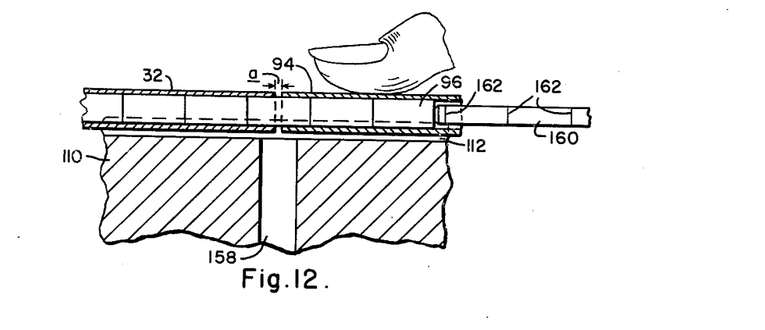
FIG. 12 is a partial cross-sectional view of the bed of the cladding tube loading machine of FIG. 1 as pellets are being pushed from a transfer tube into a cladding tube.

As stated previously, the area B of the cladding tube loading machine 10 is generally for the transfer of pellets 96 (FIG. 12) from transfer tubes 94 into a cladding tube 32. This can be accomplished manually as shown in FIG. 12 wherein a transfer tube 94 is brought in proximity to the free open end of the cladding tube 32 but is held, by finger pressure or by other suitable clamping means (not shown), a slightly spaced distance *a* therefrom so that when the pellets are pushed into the cladding tube 32 chips and other scrap materials from the pellets can drop between the adjacent tube ends and through a hole 158 formed in the bed 110 of the loading machine 10 so as not to be carried into the cladding tube 32. It will be noted that the space *a* should be large enough for most of the scraps to fall through but not so large as to allow a pellet 96 to drop through. These same limitations should be generally met with respect to the size of the hole 158 which should not be so long as to permit a pellet to drop through in its aligned position.

After a transfer cartridge or tube 94 is placed in the position as shown in FIG. 12, the operator then manually inserts a push rod 160 (only one end of which is shown) into the other end of the transfer tube 94 to push the pellets 96 from the transfer tube 94 into the cladding tube 32. As stated previously, each transfer cartridge 94 in this arrangement carries sufficient pellets for one column's length, which is generally one-sixth of the cladding tube length. The above method for insertion is used for loading all the columns in a cladding tube 32 except the last column the loading which follows a somewhat different procedure. When the last load of pellets is pushed into position, gradations 162 on the end of the push rod 160 are visible so that the operator can readily tell when an extra pellet need be removed to allow room for putting in an end plug in the end of the last column filled. The first gradation 162 is located a distance from the end of the rod 160 at least equal to the length of a plug. The second gradation 162 is located a distance from the end of the rod 160 equal to a pellet length plus the length of the plug. The third gradation is equal to two pellet lengths plus the length of the plug and so on. If the push rod 160 can be inserted beyond its second gradation 162 then one more pellet should be added. If it can be inserted beyond the third gradation 162 then two pellets should be added, and so on. On the other hand if the rod 160 cannot be inserted up to the second gradation 162 after the last column of pellets have been inserted then no more pellets need be added, there not being enough room left for another pellet and a plug. It is understood that there must be enough room left in the end of the tube 32 to insert the rod 160 to its first gradation 162 to allow for a plug, and it may be necessary to remove a pellet to accomplish this.

Prior to each load of pellets being pushed into its final position in the area C and the cladding tube being crimped with the last disc in place, the pellets are brought approximately into a fairly loose position by means of the vacuum assist created through the exhaust of air from the tube 150 located within the collet 114 as mentioned previously. Thus, generally when a load of pellets 96 are pushed from a transfer cartridge 94 into an end of a cladding tube 32 by means of the push rod 160, the differential in air pressure aids in pushing the pellets in a fairly loose fashion generally into the column position they will have in the cladding tube. However, when the first column or section of the cladding tube 32 is being loaded, the vacuum is desirably not used because the main central aperture 45 (FIG. 5) in the end disc 44 lets out so much air exhaust such that the resultant differential air pressure is too great. That is, the speed of the pellets traveling within the cladding tube due to this high air pressure causes them to jam up at the far end of the cladding tube so that the pellet could be seriously damaged. It is understood that a pressure dropping valve could be used if desired to reduce the suction effect on the loading of the first column length of pellets, but this has not been found to be necessary for effective operation. However, after the first column is loaded and crimped, the crimping to be explained later in detail, the loading of the second and subsequent columns, except the last column, are substantially aided by the vacuum suction in that, since the first column of pellets introduces considerable pressure drop due to the relatively close tolerances between the pellets and the tube and substantially blocks the central aperture 45 in the end disc, only a limited amount of suction can be created around the outside surfaces of the pellets and of the end disc between the crimped and the non-crimped portions of the cladding tube to accomplish the desired results. When the last column or section of the cladding tube 32 is being loaded, the movable push rod 160 is of sufficient length to push the pellets 96 through the transfer tube 94 and into their proper position so as to make the use of the vacuum suction unnecessary. The manipulation of this vacuum is controlled by a valve operated by a lever 165 (FIG. 2), the system for which will be described later.

The crimping and ramming operation as performed in the area C of FIGS. 1 and 2 is shown in more detail in FIGS. 13 to 17. Located intermediate the spaced bed portions 110 on the surface 12 of the loading machine 10 is an open V-type die 164 which contains the apparatus for crimping discs 166 that are placed in a cladding tube after the loading of each column. As explained previously, the end disc 44 is located in the cladding tube prior to placing of the cladding tube into the loading machine 10. After the pellets 96 are first loosely inserted into the cladding tube 32, that is, are transferred from the transfer tube 94 to the cladding tube 32 and pulled together by vacuum assist, the cladding tube 32 is slid along the anti-friction lined V-groove 112 by means of the reciprocating collet 114 to the point where it enters a guide bushing 170 in the die 164. The bushing 170 is preferably made of hardened tool steel and polished on its inside. That is, the crimping die 164 has a guide aperture 172 located in the front thereof of a size so as to closely receive the cladding tube 32. After one column of pellets 96 have been inserted into the free end of the cladding tube, the cladding tube 32 is then moved along the bed and groove 112 into the aperture 172 of the crimper 164 and over a ram rod 174 which serves to push the pellets into their proper and more compact position within the cladding tube 32.

The ram rod 174 has a diameter slightly less than the inside diameter of the cladding tube 32 so that it can be readily inserted therein. The ram rod 174 also rests in the extension of the groove 112 in the right-hand portion of the bed 110, as viewed in FIG. 13, but has its disc containing end, to be described later, disposed so it can be raised upwardly a considerable distance by a rod trip 176 so that a stop member 166 can be placed on the end of the rod 174 to be inserted in the cladding tube 32 after each column of pellets. The rod trip 176 is located in an opening 177 in the bed 110 and is manually operated by a lever 178 (see FIGS. 1 and 2) connected to a pivotal shaft 180 at the base thereof. It can be noted that the rod 176 has an extension 182 beyond the cladding tube engaging end 184 thereof to act as a guide for keeping the ram rod 174 in correct alignment when it is raised and then again lowered into its ramming position.

The ram rod 174 includes a necked down stud portion 186 similar to that shown in the stud 38 in FIG. 5. A disc is placed on the portion 186 by slipping it over the end of that portion by way of a central aperture 208 in the disc of a size to closely fit on the portion 186. The reason for the portion 186 being so much longer than the thickness of the disc 166 is so that the disc will be spaced a predetermined distance from the end of the last pellet of the previous column to allow for expansion of the pellets 96 within the cladding tube 32. This is necessary because when used in a nuclear reactor, uranium type pellets expand at a greater rate than the stainless steel cladding tubes that are commonly used so that space is needed for this difference of expansion. As can readily be seen from FIG. 13, the portion 186 has engaged therearound a protruding but resilient whisker 188, which can be made of piano wire or the like, to retain the disc 166 on the end of the rod 174 until it is crimped in place in the cladding tube 32. This resilient whisker 188 allows removal of the disc 166 if retraction of the rod 174 is desired before the disc 166 is actually crimped into place, since it holds the disc 166 to the end of the rod unless the disc is held fast to the tube so that the whisker will bend in when the rod is withdrawn.

Figures 13, 14, 15, 16, 17:
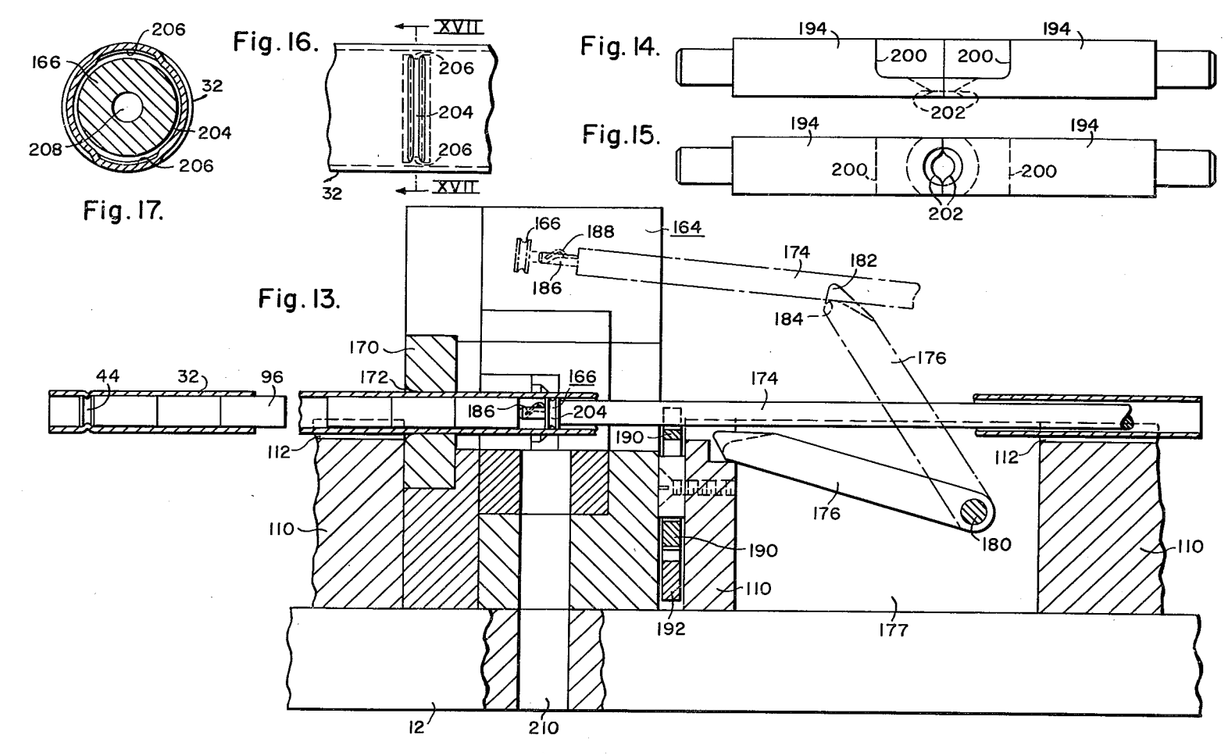
FIG. 13 is an enlarged partial cross-sectional view of the crimping and ram rod portion of the cladding tube loading machine taken substantially along the reference line XIII—XIII of FIG. 2.
FIG. 14 is an enlarged top plan view of the crimping dies used in the arrangement of FIG. 13.
FIG. 15 is a side view of the crimping dies of FIG. 14.
FIG. 16 is an enlarged fragmentary view of a cladding tube and a disc after the disc has been crimped in place by the apparatus of FIG. 13.
FIG. 17 is a cross-sectional view of the cladding tube and disc in FIG. 16 taken generally along the reference line XVII—XVII thereof.

After a disc 166 is placed over the stud portion 186 while the ram rod 174 is in its raised position, the rod trip 176 is then lowered and the ram rod 174 rests within the groove 112. However, since the diameter of the ram rod is slightly smaller than the outside diameter of the cladding tube 32, when the former is resting in the groove 112, it is somewhat lower than it should be for entrance into the free end of the cladding tube 32. Because of this displacement, an alignment rod 190 is incorporated into the apparatus just behind the crimper 164. The alignment rod 190 is actuated by a protruding lever 192 so that just before entrance into the tube 32 by the rod 174, the lever 192 is actuated so as to raise the ram rod slightly so that it is aligned properly with the aperture 172 in the crimper and in the free end of the cladding tube 32. After this the collet 114 is actuated and the tube 32 is brought over the end 186 of the ram rod, and the pellets 96 are pushed down into the cladding tube up to their final position where it automatically stops. This stopping occurs because each new column length of pellets hits the previously crimped end disc and since only a small line pressure is used the force is readily restrained by the rigid ram rod 174.

Extending laterally into the sides of the crimper 164 are the crimping dies 194 (FIGS. 2, 14 and 15). The dies 194 are actuated by rams 196 which are in turn forced to move by way of the compressed air actuators 198. The crimping dies 194 are formed with wide mating openings 200 which taper to a narrow confined opening formed by the teeth 202. These teeth are designed to provide an ovate-shaped crimp around two sides of the wall of a cladding tube 32 to engage a groove 204 in a disc 166. A disc after being crimped into place is illustrated in FIGS. 16 and 17 where it can be seen that by the crimping action therein the cladding tube 32 is ovated slightly so that air can pass through spaces 206 formed at the top and bottom of the disc 166 for the passage of air as explained earlier. The aperture 208 in the center of the disc 166 is that through which the projection portion 186 of the ram rod 174 fits. It is of course understood that after a pellet 96 is placed against a disc 166, the opening 208 is covered and air can then only pass through the spaces 206 between the disc 166 and the tube 32. This, in effect, minimizes the suction force on the pellets 96 from the tube 150 so as not to crush the pellets when sucked into position before ramming as more briefly explained previously.

After pellets 96 are rammed into the cladding tube 32 by the ram rod 174, a disc 166 is fixed in position when a crimp mechanism (to be explained later) is actuated so that the compressed air actuated dies 194 close on the sides of the cladding tube 32 and firmly secure the disc 166 in position. After this, the cladding tube is backed off the rod to its former retained position. The operation is again repeated whereby more pellets, generally a column's length, are placed in the cladding tube and the cladding tube 32 is again moved over the ram rod 174 and a disc is crimped into place until the cladding tube is completely loaded. It might be added that a discharge hole 210 is provided through the bottom of the crimper 164 and in the surface 12 of the bed 110 for discharge of improperly inserted or otherwise rejected discs 166 when this is necessary.

The crimping and ram rod arrangement of FIG. 13 can also be adapted for larger cladding tubes, if desired. That is, the guide aperture 172 can be increased to the diameter of a larger cladding tube and, where necessary the crimper 164 can be raised by shims underneath it. That is, it can be raised by shims between the crimper 164 and the surface 12 so that the alignment lever 190 is in a proper position. In this situation, more air pressure is usually needed to properly crimp the cladding tube 32 because in such larger tubes the strength of the metal used therein generally is greater.

Figure 18:
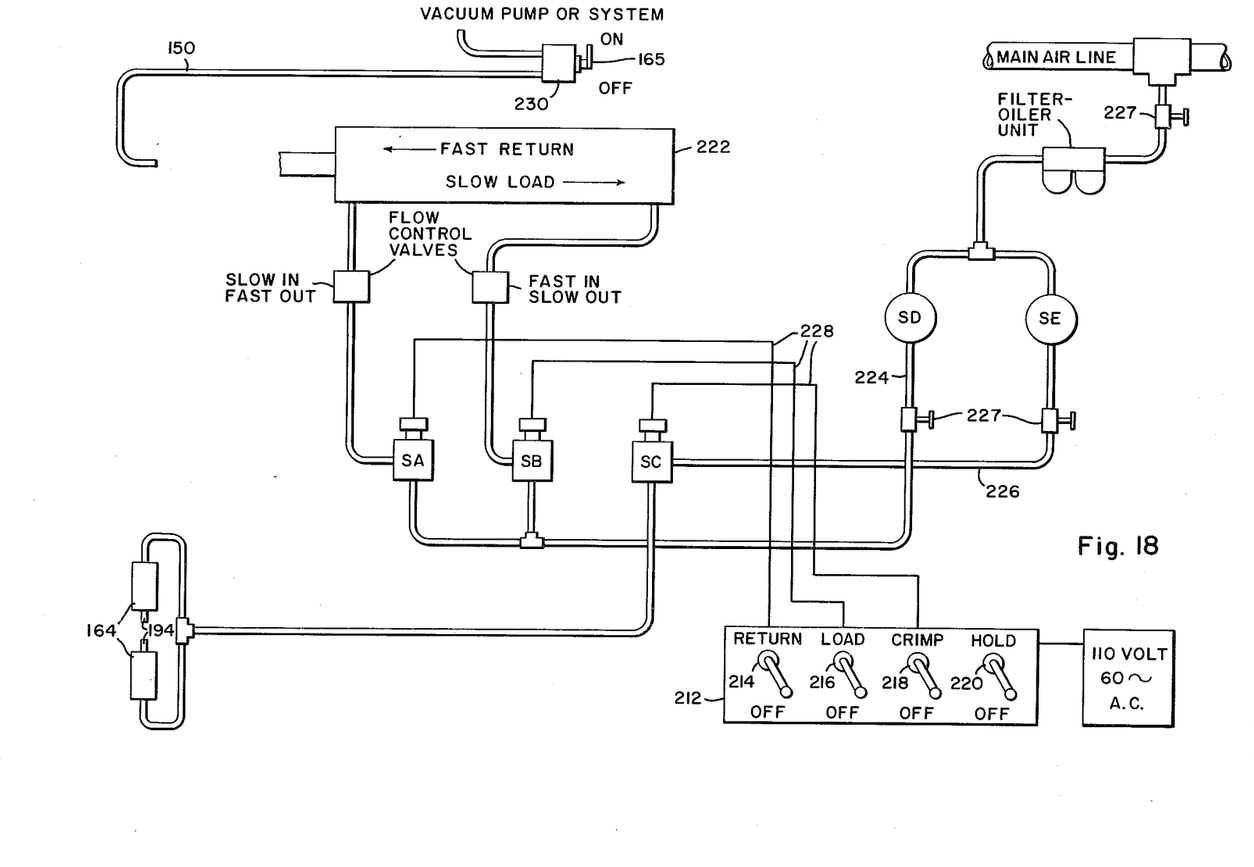
FIG. 18 is a system diagram of an electronically and air controlled arrangement for operation of the cladding tube loading machine shown in FIG. 1.

To explain more thoroughly the operating mechanism of the cladding tube loading machine 10, a diagrammatic illustration of the air lines and control mechanisms are seen in FIG. 18. To correlate some of the components of FIG. 18 with those shown in FIGS. 1 and 2, it can be seen that the control box 212, in this example, contains four levers 214, 216, 218 and 220. These can be designated "Return," "Load," "Crimp" and "Hold," respectively. Also correlated are the crimping dies 194 which are operated by the crimper 164. The collet and drive mechanism for reciprocating a cladding tube 32 along the bed of the cladding tube loading machine 10 is designated in FIG. 18 as reference numeral 222, with the direction of travel being indicated by the arrows and the terms "Fast Return" and "Slow Load." This means that the return can be a relatively fast operation to back the tube off the ram rod after each column section is loaded and that the loading should be substantially slower than this so as not to damage the pellets 96 (FIG. 13) being loaded into the cladding tube 32. Lines such as 224 and 226 actually represent the air tubes. These air tubes are operated by several multiposition solenoid type toggle switches, such as those found in the well known "Schrader's Catalog," which operate air flow control valves. These solenoid switches are integral with the control valves they operate and are here illustrated as controls SA, SB and SC. The aforementioned controls open and close their respective channels and operated by way of an operating block 212, which can receive approximately a current of 60 cycles per second which is transferred to the controls by way of the lead wires 228. The control SA is for returning the cladding tube 32 to its starting position and is operated by a lever mechanism 214 in the block 212. The control SB is for moving the cladding tube 32 to its loading position and is operated by a lever mechanism 216 in the block 212. The control SC is for actuating the crimping dies 194 and is operated by a lever mechanism 218 in the block 212. Lever mechanism 220 in the block 212 is for holding the machine in any operating position desired and operates by cutting off all current to the controls SA, SB and SC so that both air in and air out ceased to flow. It is understood that the levers 214, 216 and 218 merely allow or prevent current to flow to the solenoids in the controls SA, SB and SC. Regulators SD and SE are employed to adjust the air pressure from the main air line. In this modification, regulator SD preferably adjusts the air pressure to about 3 pounds per square inch while the regulator SE preferably adjusts the air pressure to about 90 pounds per square inch. Regulator SD feeds the air line 224 to controls SA and SB which handle the lower pressure air. Regulator SE feeds the air line 226 to control SC which handles the higher pressure air. The relatively slow loading and fast returning of collet 114 and its clamped cladding tube 32, designated as a reciprocating carriage mechanism 222 in FIG. 18, is achieved by flow control valves, so designated in FIG. 18, and also well known and found in "Schrader's Catalog" arranged so that control SA handles air on the basis of slow in and fast out. On the other hand, control SB handles air oppositely as fast in and slow out. This arrangement allows air to enter fast through the control SB and the pressure created in the carriage mechanism 222, here a piston and cylinder (not shown) operated arrangement, exhausts slowly through the control SB permitting slow speed for loading. The valves 227 are for manually controlling air flows, when it is desired to close down operation of the loading machine 10.

Separate from the operating box 212 is a control box 230 which is pneumatically operated and is, in effect, a valve which permits reduction of air-pressure through the vacuum line 150, illustrated as a tube in FIG. 10, and which aids in moving the pellets 96 generally into the far end of the tube 32 just prior to being rammed by the ram rod 174 as explained previously. This vacuum is turned on and off by means of a valve lever 165.

In summary, the operation of this invention takes place as follows:

(1) Insert a cladding tube 32 in the end crimping apparatus of FIG. 3 and crimp an end disc 44 (FIG. 6) in place.

(2) While the end disc 44 is being crimped into place in the cladding tube 32, fill transfer cartridges 94 with accurately sized and aligned pellets 96 using the apparatus of FIGS. 7 and 8 or its equivalent.

(3) Assemble workable quantities of cladding tubes 32 from operation (1) and cartridges from operation (2) in racks or trays at the loading machine.

(4) Insert the disc end of a tube 32 in the collet 114; and, only after a first column section is loaded, open vacuum valve 165.

(5) Move the ram rod trip 176 to its up position and load the ram rod projection 186 with a disc 166 and then release the ram rod trip 176. See FIG. 13.

(6) Place a transfer cartridge 94 in the area B (FIG. 1) on the bed 110 and manually (and through the use of suction for all but the first and last column length of pellets) insert one column's length of pellets 96 into the open free end of the cladding tube 32.

(7) Press the alignment lever 192 (FIG. 13) to align the ram rod 174 with the opening 172 of the crimper 164.

(8) Operate the load lever 216 (FIG. 18) to actuate the collet until it automatically stops.

(9) Operate the crimp lever 218 so as to crimp a disc 166 in the tube 32.

(10) Actuate the return lever 214 and bring the collet back to its stop position which is set for the length of the cladding tube being loaded.

(11) If at this time or during any part of the loading cycle it should be desired to stop or hold the collet motion, hold lever 220 can be actuated.

(12) Repeat the above operation until a cladding tube 32 is fully loaded.

(13) After the last column's length of pellets is loaded check with a gauge rod 160 (FIG. 13), add or remove any pellets 96 necessary, and crimp the last disc 166 in place.

(14) Release the collet 114, close the vacuum valve 164, and remove the loaded tube 32.

As an alternative to the manual transfer of pellets 96 from transfer cartridges 94 to cladding tubes 32 by the use of a push rod 160, there can be substituted an automatic type loading mechanism, if desired. A device which can accomplish this purpose and can be placed in the area B of the loading machine 10 is that illustrated in FIGS. 19 and 20. The automatic loader 234 includes a pair of mating blocks 236 and 238 which are mounted on the supporting surface 12 and contain a rotating barrel 240 therebetween. The barrel 240 has spaced ridges 242 which are adapted to receive transfer cartridges 94 therebetween with the cartridges being gravity fed thereto through an inclined chute 244. The transfer cartridges 94 enter into the internals of the loader 234 through a longitudinal opening 246 which is formed by spaced surfaces at the junction between the blocks 236 and 238. The length of this opening 246 is sufficient to receive the full length of a transfer cartridge 94. During each cycle of the operation of loading a cladding tube, with a cycle here being defined as the loading of a single column length of pellets within a cladding tube, a transfer cartridge 94 is dropped into the groove 248 in the lower block 238 which is substantially in alignment with the grooves 112 on the bed 110 of the cladding tube loading machine 10.

Figure 19:
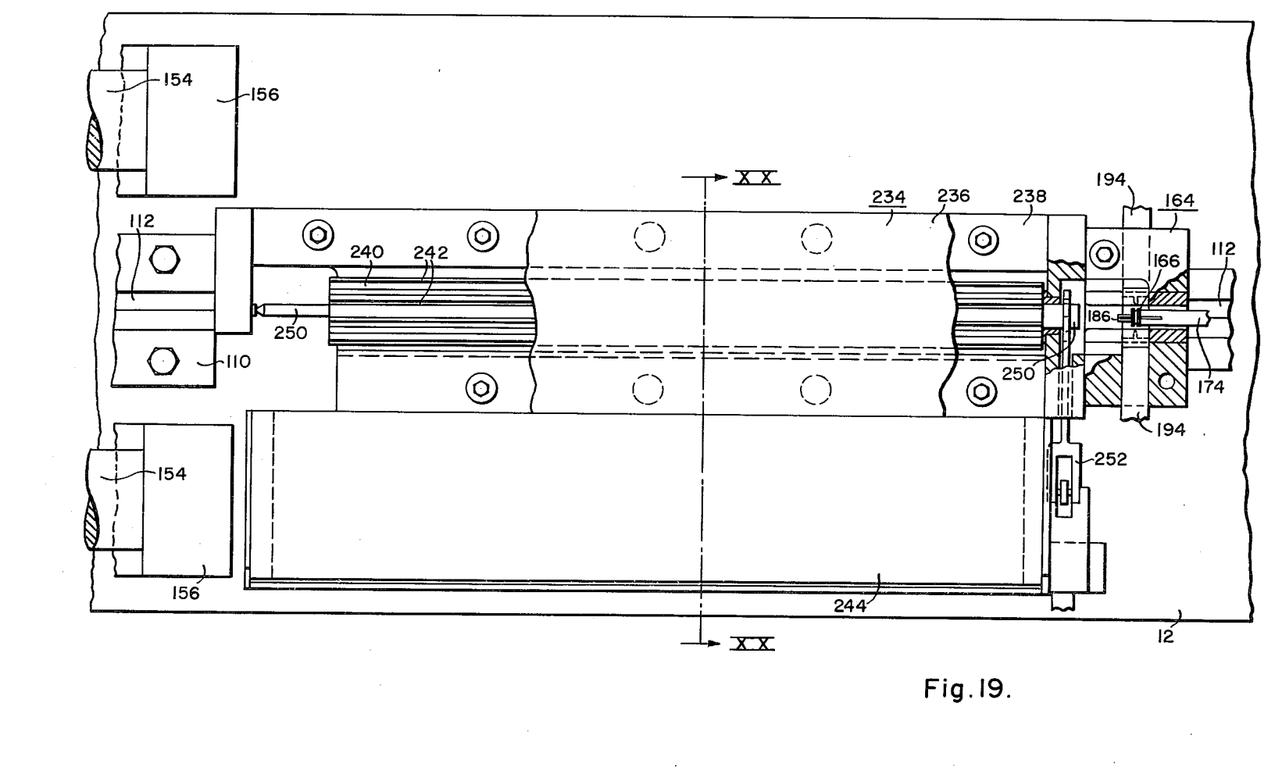
FIG. 19 is a top plan view, with certain portions being broken away and other portions sectioned for clarity, of an optional automatic pellet transfer mechanism which can be used in the cladding tube loading machine of FIG. 1.
Figure 20:
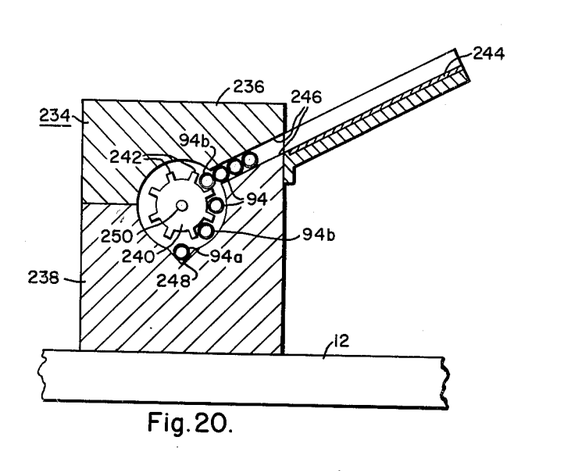
FIG. 20 is a cross-sectional view of the automatic transfer mechanism shown in FIG. 19 taken substantially along the reference line XX—XX thereof.

After a transfer cartridge 94 is dropped into the groove 248, the load lever 216 of the cladding tube 32 loading machine 10 is actuated and a cladding tube 32 is pushed along the groove 112 until it mates with the end of that particular transfer cartridge 94. The cladding tube 32 then proceeds onward and pushes the transfer cartridge ahead of it until the transfer cartridge over-engages the ram rod 174 which pushes the pellets into the cladding tube 32 from the transfer cartridge. After the pellets from the transfer cartridge 94 are loaded, a disc 166 is crimped into place inside the cladding tube 32. In this operation, the transfer cartridge 94, which has just been emptied, is slid along the shaft of the ram rod 174 so as to be out of the way, and as each succeeding transfer cartridge 94 is emptied it also travels onto the ram rod shaft pushing the preceding transfer cartridge therealong until an entire cladding tube 32 is loaded. The shaft is generally long enough to accommodate the necessary number of transfer cartridges for each cladding tube loading. At this time the loaded cladding tube 32 is removed from the cladding tube loading machine 10, the ram rod 174 is raised, and the emptied transfer cartridges 94 are removed therefrom to make room for additional transfer tubes when the next cladding tube is loaded. The barrel 240 is rotated about a central pivoting rod 250 which is in turn actuated by an air controlled indexing lever and ratchet arrangement 252 whereby after the pellets from a single transfer cartridge 94 are loaded the ratchet turns the pivot rod 250 a sufficient distance to bring the next transfer cartridge 94a into position for loading a subsequent column section of the cladding tube. As the ratchet arrangement 252 is turned this sufficient distance, the lowermost transfer cartridge 94b merely falls into place on the trough 248 due to the inclined angle thereof.

It can be seen that the present invention relates to a novel process and apparatus for a more efficient loading of pellets in nuclear or other types of elongated tubes, both as to quantity loaded per man per unit time and as to reduction in scrap rate. This operation thus provides a substantial improvement in the methods of loading cladding tubes and is especially important when one considers that for a particular neutronic reactor the number of cladding tubes that need be loaded usually will be in the thousands.

Since it is obvious that the invention can be embodied in other forms and constructions within the spirit and scope thereof, as will be apparent to one skilled in the art, it is to be understood that the particular forms shown are but a few of such embodiments. Accordingly, the descriptive material herein is to be taken as illustrative of the invention and not as limitative thereof. Moreover, it is to be understood that certain features of the invention can be employed without a corresponding use of other features thereof.

We claim as our invention:

1. Apparatus for loading pellets in an elongated tubular member open at one end, said apparatus comprising an elongated bed portion, carriage means for movably clamping said tubular member to said bed portion, means for bringing pellets to said open end of said tubular member, means including a ram rod for inserting said pellets into said tubular member, said ram rod secured to said bed portion so that an end thereof can be juxtapositioned to the open end of said tubular member, means for holding a stop member on that juxtapositioned end of said ram rod, said ram rod having a cross-section shaped to be insertable in said tubular member and a length sufficient to compact said pellets into position and to locate said stop member a predetermined distance within said tubular member, and means located on said bed portion for securing said stop member within said tubular member, said stop member preventing said pellets from leaving the open end of said tubular member after the ram rod is withdrawn.

2. A machine for loading pellets in an elongated tubular member open at one end, said machine comprising an elongated bed portion, carriage means for movably clamping said tubular member to said bed portion, means for bringing pellets to the open end of said tubular member, suction means connectable to the other end of said tubular member for loosely bringing said pellets into position within said tubular member, means including a ram rod for inserting said pellets into said tubular member, said ram rod secured to said bed portion so that an end thereof can be juxtapositioned to the end of said tubular member, means for holding a stop member on that juxtapositioned end of said ram rod, said ram rod having a cross-section small enough to be insertable in said tubular member and a length sufficient enough to compact said pellets into said position and to locate said stop member a certain distance within said tubular member, and means located on said bed portion for securing said stop member within said tubular member, said stop member preventing said pellets from leaving the open end of said tubular member after the ram rod is withdrawn.

3. Apparatus for loading discrete members in an elongated tubular member having an open end, said machine comprising an elongated bed portion, elongated guide means formed in said bed portion, said tubular member being locatable in said guide means, means for bringing pellets into said tubular member, a ram rod located in said guide means adjacent an open end of said tubular member, said ram rod being shaped for insertion into said open end of the tubular member, means forming part of said bed portion for aligning said ram rod with said open end, and means connected to said bed portion for moving one of said tubular member and said ram rod relative to the other to insert said ram rod in said tubular member so that said ram rod engages said discrete members to position them properly in said tubular member.

4. Apparatus for loading pellets in an elongated tubular member having an open end, said apparatus comprising an elongated bed portion, elongated guide means formed in said bed portion, said tubular member being locatable in said guide means, means for bringing pellets into said tubular member, a ram rod located in said guide means adjacent an open end of said tubular member, said ram rod being shaped for end insertion into said open end of the tubular member, means forming part of said bed portion for aligning said ram rod with said open end, means on the insertable end of said ram rod for releasably holding a stop member insertable into said tubular member, means connected to said bed portion for moving one of said tubular member and said ram rod relative to the other to insert said rod into said tubular member, and means located on said bed portion for securing said stop member a predetermined distance within said tubular member.

5. In apparatus for loading discrete members in an elongated tubular member, the combination comprising an elongated bed portion, an elongated groove formed in said bed portion, a collet movable along said bed portion, said collet including a clamping member adjustable towards and away from said groove and overlying said groove, the overlying portion of said clamping member including an inwardly curved portion opposite said groove, and means in said collet for moving said curved portion of said clamping member towards said groove such that said tubular member is engageable between said curved portion and said groove.

6. In apparatus for loading discrete members in an elongated tubular member, the combination comprising an elongated bed portion, an elongated groove formed in said bed portion, a collet movable along said bed portion, said collet having a body portion and a clamping portion, a jaw member forming part of said clamping portion and located adjacent said bed portion, said jaw member including an inwardly curved portion opposite said groove and a protrusion for engaging a mating indent of said tubular member, and spring biased means between the jaw member and the rest of said clamping portion for moving said jaw member towards the groove of said bed portion such that said tubular member is engageable between said curved portion and said groove.

7. A machine for loading discrete members in an elongated tubular member, said machine comprising an elongated bed portion, an elongated groove formed in said bed portion, anti-friction material lining said groove, a collet mounted for reciprocal movement along said bed portion, said collet including a clamping member overlying said groove, the overlying portion of said member including an inwardly curved portion opposite said groove, an end portion of said tubular member being locatable in said groove and under said curved portion, means in said collet for moving said curved portion towards said groove to clamp said tubular member slidably in said groove, a suction channel member located under said collet and in said groove so as to have its end in juxtaposition with said end portion of said tubular member, gasket means for sealingly and releasably engaging the mating ends of said channel member and tubular mamber, and means forming part of said machine for moving said collet and said tubular member when engaged therewith back and forth along said bed portion.

8. Apparatus for loading discrete members in an elongated tubular member, said apparatus comprising an elongated bed portion, an elongated lined groove formed in said bed portion, anti-friction material lining said groove, means for sliding said tubular member back and forth along said groove, a ram rod located in said groove adjacent one end of said bed portion and being shaped to fit into said tubular member, a stop disc releasably held on the insertable end of said ram rod, crimping dies located on said bed portion and adapted to crimp the wall of said tubular member into securing engagement with said disc, said ram rod being of a length to insert said disc a predetermined distance in said tubular member and compact said discrete members therein.

9. A machine for loading pellets in an elongated tubular member, said machine comprising an elongated bed, an elongated guide means formed in said bed, a suction channel member located in said guide means adjacent one end of said bed, beans for sealably mating said channel member with an end of said tubular member, a ram rod located generally parallel to said guide means adjacent the other end of said bed and shaped to be insertable into the other end of said tubular member, means for moving said tubular member back and forth along said guide means, and means for locating said pellets adjacent said other end of said tubular member between that end and said ram rod, said suction channel member serving to loosely draw pellets towards said one end of said tube and said ram rod serving to firmly pack said pellets in position in said tube.

10. A machine for loading pellets in an elongated tubular member, said machine comprising an elongated bed, an elongated guide means formed in said bed, a suction channel member located in said guide means adjacent one end of said bed, means for sealably mating said channel member with an end of said tubular member, a ram rod located generally parallel to said guide means adjacent the other end of said bed and shaped to be insertable into the oher end of said tubular member, means for moving said tubular member back and forth along said guide means, means for releasably holding a disc having a channeled periphery on the insertable end of said ram rod, crimping means engaged with said bed portion for at least partially caving in the wall of said tubular member into the channeled periphery of said disc, said crimping means being shaped to engage less than the entire circumference of the tubular member to leave an opening between said disc and the wall of said tubular member, means for locating said pellets in said other end of said tubular member, said channel member serving to exhaust air from said tubular member through said opening to draw said pellets towards said one end of said tubular member, and said ram rod being of sufficient length to firmly pack said pellets in position and locate said disc a predetermined distance within said tubular member.

11. A machine for loading pellets in a tubular member, said machine comprising an elongated bed, a plurality of functional stations located along the length of said bed, a collet means mounted for reciprocal movement along said bed in a first one of said stations for movably securing said tubular member to said bed, suction means on said bed in said first station for pulling said pellets within said tubular member, means in a second one of said stations for enabling said pellets to be transferred from a cartridge to said tubular member, a ram rod connected to said bed and located in a third one of said stations, said ram rod being shaped for insertion into said tubular member and being of a length sufficient to push said pellets into a compact position and locate a stop member a predetermined distance within said tubular member, and means engaged with said bed in said third station for securing said stop member in said tubular member to retain the pellets therein.

12. A machine for loading pellets in a tubular member, said machine comprising an elongated bed, a plurality of functional stations located along the length of said bed, a collet means mounted for reciprocal movement along said bed in a first one of said stations for movably securing said tubular member to said bed, suction means on said bed in said first station for pulling said pellets within said tubular member, an automatic transfer means in a second one of said stations for enabling said pellets to be transferred from a cartridge to said tubular member, a ram rod connected to said bed and located in a third one of said stations, said ram rod being shaped for insertion into said tubular member and being of a length sufficient to push said pellets into a compact position and locate a stop member a predetermined distance within said tubular member, and means engaged with said bed in said third station for securing said stop member in said tubular member to retain the pellets therein.

13. A machine for loading pellets in a tubular member, said machine comprising an elongated bed, a plurality of functional stations located along the length of said bed, a collet means mounted for reciprocal movement along said bed in a first one of said stations for movably securing said tubular member to said bed, suction means on said bed in said first station for pulling said pellets within said tubular member, a ratchet type gravity fed and vacuum operated barrel loader on said bed at a second one of said stations for enabling said pellets to be transferred from cartridges to said tube, a ram rod connected to said bed and located in a third one of said stations, said ram rod being shaped for insertion into said tubular member and being of a length sufficient to push said pellets into a compact position and locate a stop member a predetermined distance within said tubular member, and means engaged with said bed in said third station for securing said stop member in said tubular member to retain the pellets therein.

14. Apparatus for securing an end disc in an elongated tubular member, said apparatus comprising an elongated bed portion including a guide means for said tubular member, a pivotal stud member secured to said bed adjacent one end thereof, said stud having a first neck projection being shaped to enter an open end of said tubular member a given distance, said stud having a second necked projection extending from said first projection for holding a disc to be inserted in said end of said tubular member, mating dies secured to said bed adjacent said stud member, said dies when separated leaving room for said stud member and said tubular member to enter therebetween from opposite directions, said dies upon closing on said tubular member and stud crimping the wall of said tubular member around said disc to hold it in said tubular member.

15. Apparatus for aligning and loading pellets in transfer cartridges, said apparatus comprising a bed portion having elongated guide means at different levels thereof, the guide means in a first one of said levels being disposed for aligning a plurality of said pellets therein, the guide means in an adjacent second one of said levels being disposed for holding an elongated transfer cartridge open at each end, each of said guide means being in alignment with one another, the guide means in said second one of said levels being disposed a sufficient distance below the guide means in said first one of said levels such that the bottom of an end opening of the transfer cartridge holdable in the latter guide means is level with the bottom of the pellets holdable in the former, said adjacent guide means shaped such that said pellets can be disposed for ready transfer into said transfer cartridge opening.

16. Apparatus for aligning and loading pellets in transfer cartridges, said apparatus comprising a bed portion having elongated guide means at different levels thereof, the guide means in a first one of said levels being disposed for aligning a plurality of said pellets therein, the guide means in an adjacent second one of said levels being disposed for holding an elongated transfer cartridge open at each end, each of said guide means being in alignment with one another, the guide means in said second one of said levels being disposed a sufficient distance below the guide means in said first one of said levels such that the bottom of an end opening of the transfer cartridge holdable in the latter guide means is level with the bottom of the pellets holdable in the former, said adjacent guide means shaped such that said pellets can be disposed for ready transfer into said transfer cartridge opening, an aperture of a length and width less than that of said pellets formed through the bottom of at least one of said guide means to allow chips and other waste materials to fall therethrough, and at least the guide means in the first one of said one levels being lined with an anti-frictional material to reduce resistance to movement of the pellets therealong.

17. Apparatus for aligning pellets to be loaded into elongated tubes, said apparatus comprising a funnel-shaped housing having a wide opening and a narrow opening, a trough extending outwardly from said narrow opening and including an elongated groove for aligning pellets passing through said opening, opposed protrusions extending inwardly from the inner walls of said housing adjacent said narrow opening, said protrusions being spaced a distance to permit pellets to pass through said narrow opening one at a time and into said trough for alignment.

18. The process of loading pellets into an elongated tubular member having open ends, said process comprising the steps of placing a stop member in one of said ends such that an aperture of a size such that said pellets can not pass through is left, placing pellets in an aligned relationship in a transfer cartridge, placing said transfer cartridge in longitudinal alignment with and adjacent to said tubular member, pushing said pellets from said transfer cartridge into the other end of said tubular member, exhausting air from said one end through said aperture to pull said pellets towards that one end, compacting said pellets at that one end, and placing a stop member in said tubular member after insertion of said pellets to prevent their removal from said tubular member through said other end.

19. Apparatus for loading discrete members into an elongated tubular member open at one end, said apparatus comprising means for clamping said tubular member, means for inserting said discrete members through said open end of said tubular member, means for holding a stop member totally within said tubular member in a predetermined juxtaposition relative to the end of said discrete members, and means for securing said stop member within said tubular member.

20. Apparatus for loading discrete members into an elongated tubular member open at one end, said apparatus comprising an elongated bed, an elongated guide means formed in said bed, a ram rod located generally parallel to said guide means and shaped to be insertable into said open end of said tubular member, means for moving said tubular member back and forth along said guide means, and means for locating said discrete members adjacent the other end of said tubular member between that end and said ram rod.

21. Apparatus for securing a stop member in an elongated tubular member, said appartus comprising an elongated bed portion including a guide means for said tubular member, a pivotal stud member secured to said bed portion adjacent one end thereof, means on said pivotal stud member for holding a stop member, means for positioning said stop member inside said tubular member, and means for crimping the wall of said tubular member around said stop member.

22. Apparatus for aligning and loading pellets into an elongated tubular member open at each end, said apparatus comprising a bed portion having fixed elongated guide means at different levels thereof, the guide means in a first one of said levels being disposed for aligning a plurality of said pellets therein, the guide means in an adjacent second one of said levels being disposed for holding said elongated tubular member, each of said guide means being longitudinally aligned with one another, and means for transferring said pellets into said tubular member.

23. The combination of claim 18 wherein said tubular member and transfer cartridge are horizontally positioned and their adjacent ends are spacedly positioned from one another.

References Cited by the Examiner

UNITED STATES PATENTS

| | | | |
|---|---|---|---|
| 730,432 | 6/03 | Baker | 53—366 X |
| 1,509,916 | 9/24 | Waite | 53—22 |
| 1,913,259 | 6/33 | Bashford | 53—40 X |
| 2,376,840 | 5/45 | Weigand | 53—22 X |
| 2,509,069 | 5/50 | Mrachek | 53—78 X |
| 2,518,970 | 8/50 | Zabel | 53—22 |
| 2,884,748 | 5/59 | Berg | 53—24 |
| 2,977,736 | 4/61 | Condis | 53—254 |
| 3,053,743 | 9/62 | Cain | 53—37 X |
| 3,061,990 | 11/62 | Lakso | 53—237 |

FRANK E. BAILEY, *Primary Examiner.*

BROMLEY SEELEY, ROBERT A. LEIGHEY,
*Examiner.*